Sept. 8, 1942.　　　　　G. P. STOUT　　　　　2,295,366
INSPECTION DEVICE
Filed Sept. 27, 1938　　　　2 Sheets—Sheet 2

Inventor:
GEORGE PHILIP STOUT
By K. Wilson Corder
Attorney

Patented Sept. 8, 1942

2,295,366

UNITED STATES PATENT OFFICE 2,295,366

INSPECTION DEVICE

George Philip Stout, Baltimore, Md., assignor to The Coca-Cola Company, Wilmington, Del., a corporation of Delaware Application September 27, 1938, Serial No. 231,907

8 Claims. (Cl. 210—1)

The present case is a continuation in part of my Patent No. 2,132,447, issued October 11, 1938, Process and apparatus for inspecting fluids; and relates primarily to a method of and apparatus for inspecting fluids in bulk, as for example when being passed from a tank or other container where compounded, mixed, processed, or otherwise prepared; to a point where they are packaged for distribution or subjected to further treatment.

The instant invention contemplates means for detecting foreign ingredients or impurities in the fluid being inspected, by means of electric impulses resulting from abrupt changes in a field of radiant energy, said changes being first picked up by current passing from a photoelectric cell and then amplified in such manner as to "break down" the control of a thyratron or other vacuum tube, thereby effectively indicating the presence of the foreign body, as by making operative a reject valve or other suitable mechanism whereby the fluid containing the objectionable material is diverted.

While my invention is obviously not limited to any specific use, it may be noted that it is particularly adaptable for employment in conjunction with inspecting syrups such as those from which soft drinks are prepared. Other uses suggest themselves, such as the inspection of oil used for lubricating purposes; various chemicals and chemical compounds; et cetera.

In order to facilitate understanding the present case, reference is made to the drawings herein, same being substantially diagrammatic, and in which:

Fig. 2 illustrates in detail the amplifier and thyratron which may be employed in practising the instant invention, said view being diagrammatic in part.

Fig. 3 is a somewhat diagrammatic view of various elements entering into my invention, including, inter alia, a reclaiming tank.

Figure 1:
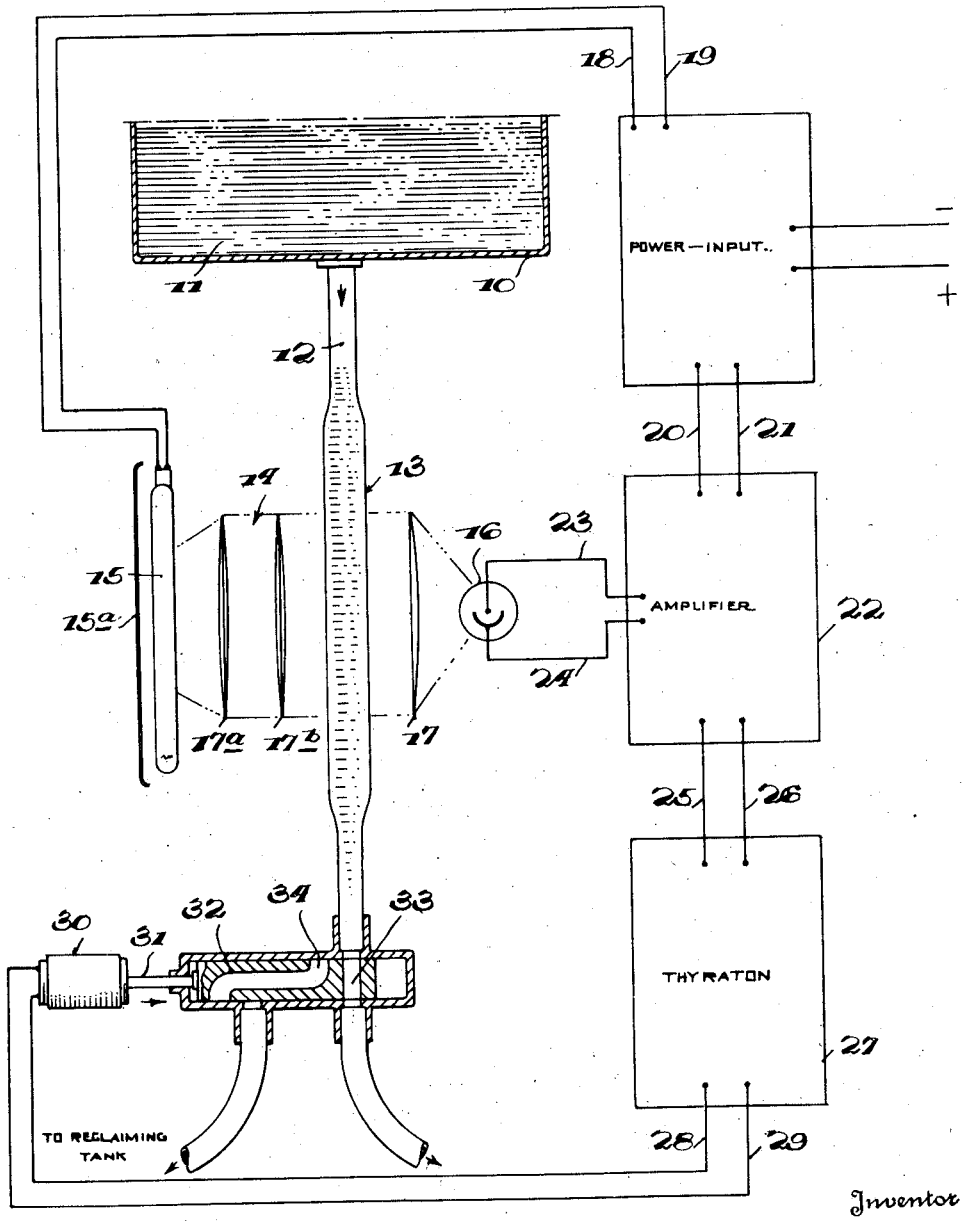
Fig. 1 illustrates an arrangement whereby fluid passing from a tank may be inspected in a manner embracing the principles of the instant invention.

In said drawings, 10 represents a tank or other receptacle calculated to contain a fluid 11, which fluid is drained therefrom through a conduit 12 upon opening of a suitable valve (not shown), said conduit having a transparent portion 13 through which is passed a beam of light 14 from a lamp 15, in such manner that all fluid passing through tube 12 must likewise pass through said beam of light, the rays of which are focused upon a photoelectric cell 16, as by means of lens 17.

Lamp 15 may be provided with a reflector or shade 15a, and lenses 17a and 17b serve to facilitate the directing of said lamp's rays through transparent section 13 of conduit 12, in the desired manner.

A suitable source of power input is provided, wires 18 and 19 carrying electric energy to lamp 15, and wires 20 and 21 to amplifier 22, which in turn connect with photoelectric cell 16 through wires 23 and 24. Connections 25 and 26 unite amplifier 22 with thyratron 27, and leading therefrom are wires 28 and 29 which when supplied with current serve to energize solenoid 30 in such manner as to move a piston 31 associated therewith in a lateral direction, which piston carries with it valve member 32 in such manner as to close the opening 33 through which fluid normally flows, and by-pass said fluid through opening 34, the liquid thus diverted being piped to a reclaiming tank 35 or otherwise disposed of.

Electric valve apparatus 27 as illustrated is of such nature that no appreciable current can flow in wires 28 and 29 under normal conditions, but when an impulse reaches the valve because of some abrupt change in the illumination falling upon photoelectric cell 16, this control action is removed, the gas in the gaseous tube valve becoming conductive and allowing free flow of current through said wires. Now assuming that a particle of foreign material in tube 12 passes through the beam of light from lamp 15, an impulse will be produced which, amplified by amplifier 22, will cause the valve control to be removed and current to flow through wires 28 and 29, thus energizing solenoid 30 to effect the reject described above.

It will be apparent that said reject may be allowed to continue until such time as the apparatus is manually shut off and restored to normal, or by means of a conventional timing device automatically achieving such restoration after sufficient time has elapsed to divert the particular fluid in which the objectionable foreign matter has been detected.

Under some conditions, it may be desirable to provide conduit 12, and particularly that portion thereof adjacent the upper edge of transparent section 13, with a series of baffles or fins calculated to impart to the fluid a swirling or circular motion, its state at the time of inspection then more closely approximating that of fluid in bottles being checked in the manner taught by my said Patent No. 2,132,447, referred to heretofore. When such a construction is employed, the time required for a given portion of fluid to pass through the field of radiant energy will be somewhat increased, and a quasi-lateral as well as vertical movement will characterize the passage of said fluid, these factors possibly contributing to a somewhat more positive inspection than when only the vertical flow exists.

Referring specifically to Fig. 2 for a more detailed explanation of my invention, it will be noted that syrup from tank 10 may encounter a spiral piece of metal in pipe 12 with the result that a swirling motion is imparted thereto as it passes through sight glass 13, this giving the liquid and the potential foreign particle a "corkscrew" type path through said sight glass. The exciter lamp 15 and the optical system 17, 17a and 17b projects on the photocell the image of any particle passing through sight glass 13. The photocell 16 normally has a fixed amount of light presented to its plate due to the fact that the syrup is uniform. However, an occasional foreign particle passing through the sight glass will momentarily diminish the radiant energy falling on said photocell, thereby changing the voltage at 23. The voltage is applied to the grid of tube 40 through capacitor 39, tube 40 operating as a standard pentode. The feeble signal from photocell 16 is amplified greatly by tube 40 and that placed on triode tube 41. This entire arrangement is known as an "A. C. amplifier." This term must not be confused to mean that this unit operates off of A. C. (it actually does as a rule, but this is only incidental). "A. C. amplifier" means that such an amplifier performs on an instantaneous pulse. Control 42 is a sensitivity control for the device and determines the amount of signal (and incidentally the minimum size of the foreign particle) necessary to operate the solenoid 30. The output of 41 is coupled through transformer 43 on to the rectifier 44. This system from here on is a time operated circuit and its function is to operate the solenoid valve instantly when a foreign particle appears at 13, but, to allow sufficient time for the foreign particle to pass from the system before solenoid 30 is again switched to the normal position. The amplified pulse reaching transformer 43 can be of either polarity. The function of 44 is to make a direct current signal from the alternating current signal presented at 43. Now, capacitor 45 is charged to a predetermined value by the passing of the particle through 13. This charge would remain on capacitor 45 indefinitely if some provision was not made to dissipate said charge. Variable resistor 46 has its function to fulfill this requirement. Now as an example, suppose thyratron tube 27 operated on a trigger voltage, or grid voltage, of 40 volts. The amplifier through 40, 41 and 44 will amplify the feeble signal from photocell 16 and present a direct current voltage of 60 volts to 45. This is more than ample to "trigger" 27. Now 45 is also charged with this above-mentioned 60 volts and the signal therefore persists on the thyratron until leakage resistor 46 has time to dissipate energy from 45 until its voltage drops below 40 volts. At that time, thyratron 27 will allow the solenoid to return to its normal position.

The amplifier is conventional in every respect.

The resistor 47 which is above the photocell is a "load resistor" for the photocell. It supplies current to the photocell and at the same time does not "load" the circuit. Resistor 48 is a grid resistor for tube 40. 49 is a cathode resistor for 48. 50 is a by-pass condenser for tube 40's cathode. 51 is a plate resistor for 40 having somewhat the same function as 47 to the photocell. 52 and 53 supply the necessary screen voltage for 40. 54 is a stabilizing resistor for the screen. 55 is a coupling resistor from tube 40 to 41. 56 and 57 are the cathode resistor and cathode capacitor for triode 41. It will be noted that thyratron 27 is recycling by virtue of the fact that it has A. C. on its plate through transformer 58. This also supplies the energy for solenoid 30. The thyratron has a chance to recover after it has flashed on every half cycle. The thyratron bias 59 is so arranged so that with the voltage from 58 no current will flow from 28 to 29 with the superimposed signal coming from the foreign particle which is impressed on 45, 46 and 27. 46 also has another function in that it is a grid return for the thyratron bias network. The return from the thyratron would be back through the bias to lead 25 through the timing resistor 46 and back to ground or 29.

A second means of accomplishing the result heretofore described lies in substituting for thyratron 27 an ordinary vacuum tube, the operation of the device then being substantially the same as described above. An advantage in using such a tube rests in the fact that the reject relay may then be back connected if desired, in which case wires 28 and 29 and solenoid 30 remain energized until such time as an impulse from amplifier 22 breaks down the vacuum tube and thereby automatically shuts the current off. In such a structure, the solenoid may be provided with a spring or other suitable means to insure that plunger rod 31, when released from the magnetic attraction of the solenoid, will move sharply to the right in such manner as to bring opening 34 of valve member 32 into engagement with the lower or discharge end of conduit 12, thereby diverting the fluid in said pipe. Such an arrangement may in some instances be deemed preferable to that first suggested herein in that apparatus thus constructed in effect "fails safe," it being apparent that upon interruption of the electrical means supplying current to the photoelectric cell or the amplifier, the vacuum tube will immediately react as in the case of an ordinary reject, thereby putting apparatus into motion to by-pass fluid until such time as the cause of the trouble is remedied.

From the foregoing, it is apparent that I have disclosed a new and useful method of and means for inspecting fluid in bulk, said fluid being passed through a beam of light, which beam is directed to fall upon a photoelectric cell, and should a foreign body, whether opaque or of an index of refraction differing from the fluid, travel through the beam with the fluid, its sudden entry into or exit from the beam will make a possibly minute but abrupt change in the illumination of the cell, and hence in the current passed by the cell, which abrupt change in current, because it is abrupt, will cause an impulse in a coupled circuit which is amplified to any necessary extent, and cause to break down a thyratron tube or an ordinary vacuum tube in such manner that the current flowing in the latter case, or started to flow in the former, will be utilized to operate a reject or indicating means.

This combination of a transparent tube section, an optical test system, and an ejector valve controlled by said system, as well as means to reclaim rejected liquid, are submitted as constituting a new combination, and the appended claims covering such are to be as broadly construed as my contribution to the art warrants.

I claim:

1. Apparatus of the class described comprising, in combination: radiant energy means including a beam of light and a photo-electric cell and amplifier to inspect fluid flowing in a conduit; a conduit to conduct fluid under test through a beam of said energy to a point of delivery; a normally closed deflecting valve located in said conduit between the point of passage of said beam therethrough and said point of delivery; and means actuated by an electrical current set up by response of said inspecting means to passage of a foreign body through its beam to open said deflecting valve whereby to reject the portion of fluid carrying said foreign body.

2. Apparatus of the class described comprising, in combination: radiant energy means including a beam of light and a photo-electric cell and amplifier to inspect fluid flowing in a conduit; a conduit to conduct fluid under test through a beam of said energy to a point of delivery; a normally closed deflecting valve located in said conduit between the point of passage of said beam therethrough and said point of delivery; means actuated by an electrical current resulting from response of said inspecting means to passage of a foreign body through its beam to open said deflecting valve whereby to reject the portion of fluid carrying said foreign body; and means for diverting to a reclaiming tank the fluid thus rejected.

3. Apparatus of the class described comprising, in combination: radiant energy means including a shaft of light and a photo-electric cell and amplifier to inspect fluid flowing in a conduit; a conduit to conduct fluid under test through a beam of said energy to a point of delivery; a normally closed deflecting valve located in said conduit between the point of passage of said beam therethrough and said point of delivery; means actuated by an electrical current governed by response of said inspecting means to passage of a foreign body through its beam to open said deflecting valve whereby to reject the portion of fluid carrying said foreign body; and means for diverting to a reclaiming tank a predetermined amount of the fluid thus rejected.

4. Apparatus of the class described comprising, in combination: radiant energy means to inspect fluid flowing in a conduit; a conduit to conduct fluid under test through a beam of said energy to a point of delivery; a photoelectric cell; means for focusing said radiant energy upon said cell after such has passed through said conduit; an amplifier receptive to impulses received from said photoelectric cell; a thyratron tube connected with said amplifier; a deflecting valve with alternate openings in said conduit between the point of passage of said radiant energy therethrough and said point of delivery; and a solenoid having a plunger rod operatively engaging said valve, said solenoid being connected with said thyratron tube and governing said valve in such manner that when becoming energized by virtue of said thyratron tube's being broken down by an amplified impulse set up by the passage of a foreign body through said radiant energy, said solenoid through its plunger rod actuates said deflecting valve, whereby to reject the fluid carrying said foreign body.

5. Apparatus of the class described comprising, in combination: radiant energy means to inspect fluid flowing in a conduit; a conduit to conduct fluid under test through said energy to a point of delivery; a photoelectric cell receiving said beam of radiant energy after such has passed through said conduit; a normally closed deflecting valve located in said conduit between the point of passage of said radiant energy therethrough and said point of delivery; and means actuated by amplified response of said photoelectric cell to passage of a foreign body through said radiant energy to open said deflecting valve whereby to reject the portion of fluid carrying said foreign body.

6. The method of inspecting fluid in bulk which consists of exposing a moving column of said fluid to a beam of radiant energy, focusing said beam upon a photoelectric cell after the beam has passed through the fluid, amplifying impulses set up by the movement of a foreign body into said beam, and employing said amplified impulses to break down a control tube thereby establishing a circuit and using said circuit to energize means for opening a deflecting valve whereby to reject the portion of fluid carrying said foreign body.

7. The method of inspecting fluid in bulk which consists of subjecting a moving column of said fluid, in a transparent conduit, to radiant energy inspection means including a beam of light, and employing response of said inspection means to passage of a foreign body through its beam to open a deflecting valve whereby to reject the portion of fluid carrying said foreign body.

8. The method of inspecting fluid in bulk, which consists of subjecting a moving column of said fluid, in a transparent conduit, to a beam of radiant energy, focusing said beam upon a photoelectric cell after passage through the fluid, amplifying impulses set up by the movement of a foreign body into said beam, and employing said amplified impulses to break down a vacuum tube governing means for opening a deflecting valve, whereby to reject the portion of fluid carrying said foreign body.

GEORGE PHILIP STOUT.